(12) United States Patent
Huang

(10) Patent No.: US 7,127,819 B1
(45) Date of Patent: Oct. 31, 2006

(54) RATCHET SCISSORS

(76) Inventor: Yong Sheng Huang, No. 169, Guozhong Rd., Wufeng Shiang, Taichung County (TW)

( * ) Notice: Subject to any disclaimer, the term of this patent is extended or adjusted under 35 U.S.C. 154(b) by 0 days.

(21) Appl. No.: 11/265,067

(22) Filed: Nov. 1, 2005

(51) Int. Cl.
*B23D 21/00* (2006.01)

(52) U.S. Cl. .................. 30/92; 30/98; 30/99; 30/251

(58) Field of Classification Search ............ 30/99, 30/98, 96, 252, 251, 92, 266, 250, 245, 249, 30/244, 192; 81/314, 337, 338
See application file for complete search history.

(56) References Cited

U.S. PATENT DOCUMENTS

| | | | | |
|---|---|---|---|---|
| 4,094,064 A | * | 6/1978 | Nishikawa et al. | 30/92 |
| 4,176,450 A | * | 12/1979 | Muromoto | 30/92 |
| 4,178,682 A | * | 12/1979 | Sadauskas | 30/250 |
| 5,184,404 A | * | 2/1993 | Chen | 30/250 |
| 5,231,763 A | * | 8/1993 | Laux | 30/250 |
| 6,481,105 B1 | * | 11/2002 | Haung | 30/98 |

* cited by examiner

*Primary Examiner*—Timothy V. Eley
*Assistant Examiner*—Omar Flores Sánchez
(74) *Attorney, Agent, or Firm*—Pro-Techtor Int'l Services

(57) ABSTRACT

Provided is scissors comprising a movable first handle unit; a stationary second handle unit including a bifurcated jaw, a pivotal blade in the jaw, a spring biased pivotal plate member in the jaw and including teeth, a gear and ratchet wheel assembly, and a spring biased pivotal pawl; and a spring biased lever including a pawl member engaged with the ratchet wheel. Continuously pivoting the first handle unit about the second handle unit by moving the first handle unit alternately back and forth in each action of pivoting the first handle unit toward the second handle unit will pivot the first and second protrusions counterclockwise, rotate the gear and ratchet assembly clockwise, and pivot the teeth counterclockwise to cut a pipe anchored in the mouth.

1 Claim, 7 Drawing Sheets

RATCHET SCISSORS

BACKGROUND OF THE INVENTION

1. Field of Invention

The present invention relates to scissors and more particularly to a pair of ratchet scissors for smoothly, stepwise cutting a pipe (e.g., water pipe) without causing deformation in a labor saving manner.

2. Related Art

A conventional pair of scissors for cutting pipe (e.g., water pipe) is shown in FIG. 1. The scissors comprises a first assembly 10 including a stationary handle unit 11, a stationary jaw 12 having an inner curved edge, and a shoulder 14; a second assembly 20 including a movable handle unit 21 and a pivotal ring 22 provided at an open end of the handle unit 21; a movable jaw 30 pivotably connected to an intermediate portion of the first assembly 10 and including a blade 31 formed on an inner edge facing the stationary jaw 12, a series of ratchet teeth 32 formed opposite the blade 31, and a raised stop 33 proximate the shoulder 14; a toggle link 40 interconnected a forward portion of the handle unit 21 and a rear portion of the jaw 30; and a pawl 51 pivotably formed between a first pivot joining portion (i.e., joining portion of the link 40 and the handle unit 21) and a second pivot joining portion (i.e., joining portion of the handle unit 21 and the stationary jaw 12), the pawl 51 being engaged with the ratchet tooth 32 and including a spring 51 pivotably formed on the handle unit 21.

A cutting operation of the scissors will be described in detailed below. A user may first place a water pipe in the open jaw in position. Note that a maximum angle between the first and second assemblies 10 and 20 is defined when the stop 33 contacts the shoulder 13. Next, the user may hold the handle with one hand and exert force to move the handle unit 21 toward the handle unit 11. The pawl 51 thus continuously moves from one tooth 32 to the adjacent tooth 32 until the pipe is cut by the blade 31. However, the prior art suffered from a couple of disadvantages. For example, a user is required to exert a great force in the cutting operation. Further, the number of the ratchet teeth 32 is limited (i.e., cutting time is short). Thus, the cut pipe may deform undesirably. Thus, a need for improvement exists.

SUMMARY OF THE INVENTION

It is therefore an object of the present invention to provide a pair of ratchet scissors for smoothly, stepwise cutting a pipe without causing deformation in a labor saving manner.

To achieve the above and other objects, the present invention provides scissors for cutting a pipe comprising a movable first handle unit of substantially U-section including a rear pivotal ring; a stationary second handle unit of substantially U-section including a plurality of parallel slots thereon with the ring disposed therein for fastening the first and the second handle units together in a storage state, a forward bifurcated jaw, a pivotal blade disposed in the jaw, a spring biased pivotal plate member disposed in the jaw and including a series of teeth formed along an outer edge, the plate member being pivotably connected to the blade, a rotation assembly including a gear and a ratchet wheel, and a spring biased pivotal pawl including an elongate channel, a first protrusion, a second protrusion engaged with the ratchet wheel, a third protrusion engaged with the ratchet wheel, and a pin disposed in one end of the channel; and a spring biased pivotal lever including a forward protuberance urged against an inner surface of the first handle unit, and a pawl member engaged with the ratchet wheel; whereby continuously pivoting the first handle unit about the second handle unit by moving the first handle unit alternately back and forth in each action of pivoting the first handle unit toward the second handle unit will pivot the first and the second protrusions counterclockwise, rotate the rotation assembly clockwise, and pivot the teeth counterclockwise to cut a pipe anchored in a position defined by the blade and the jaw; and in response to cutting the pipe pulling the first handle unit away from the second handle unit will disengage the pawl with the ratchet wheel, move the pin to the other end of the channel, cause the third protrusion to contact the protuberance, pivot the lever counterclockwise to disengage the pawl member with the ratchet wheel for pivoting the plate member and the blade away from the jaw, and rotate the rotation member counterclockwise by causing the teeth to drive the gear.

The above and other objects, features and advantages of the present invention will become apparent from the following detailed description taken with the accompanying drawings.

DETAILED DESCRIPTION OF THE INVENTION

Figure 1:
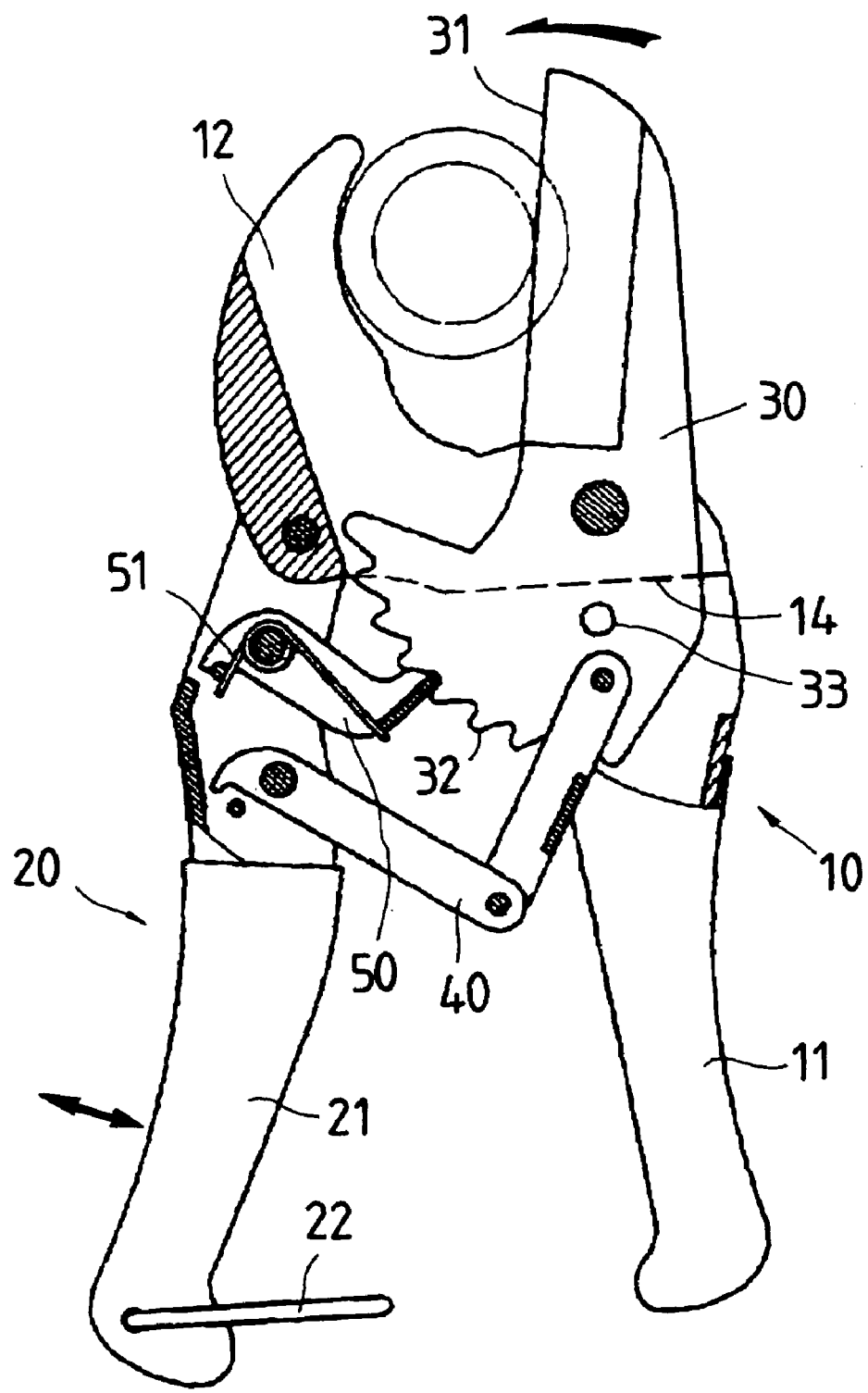
FIG. 1 is a side plan view of a conventional ratchet scissors.
Figure 2:
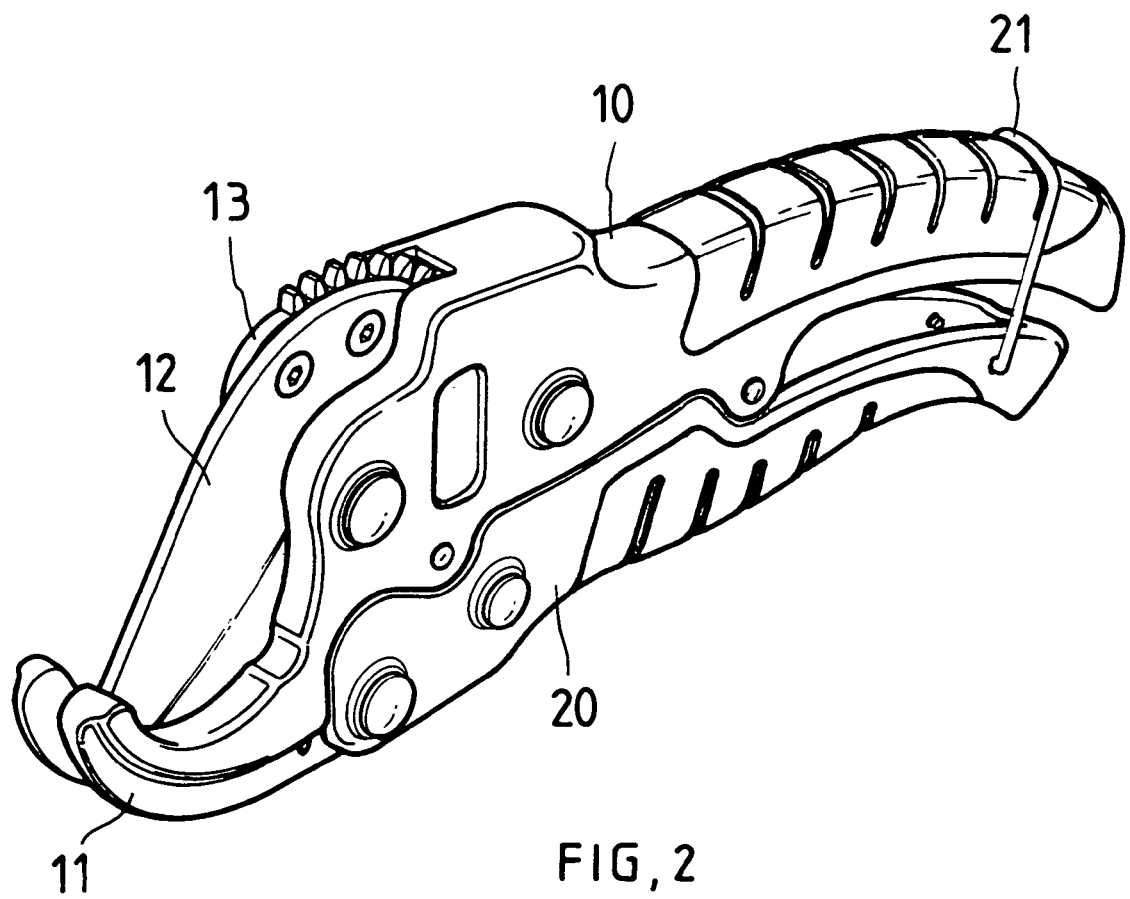
FIG. 2 is a perspective view of a preferred embodiment of ratchet scissors according to the invention.
Figure 3:
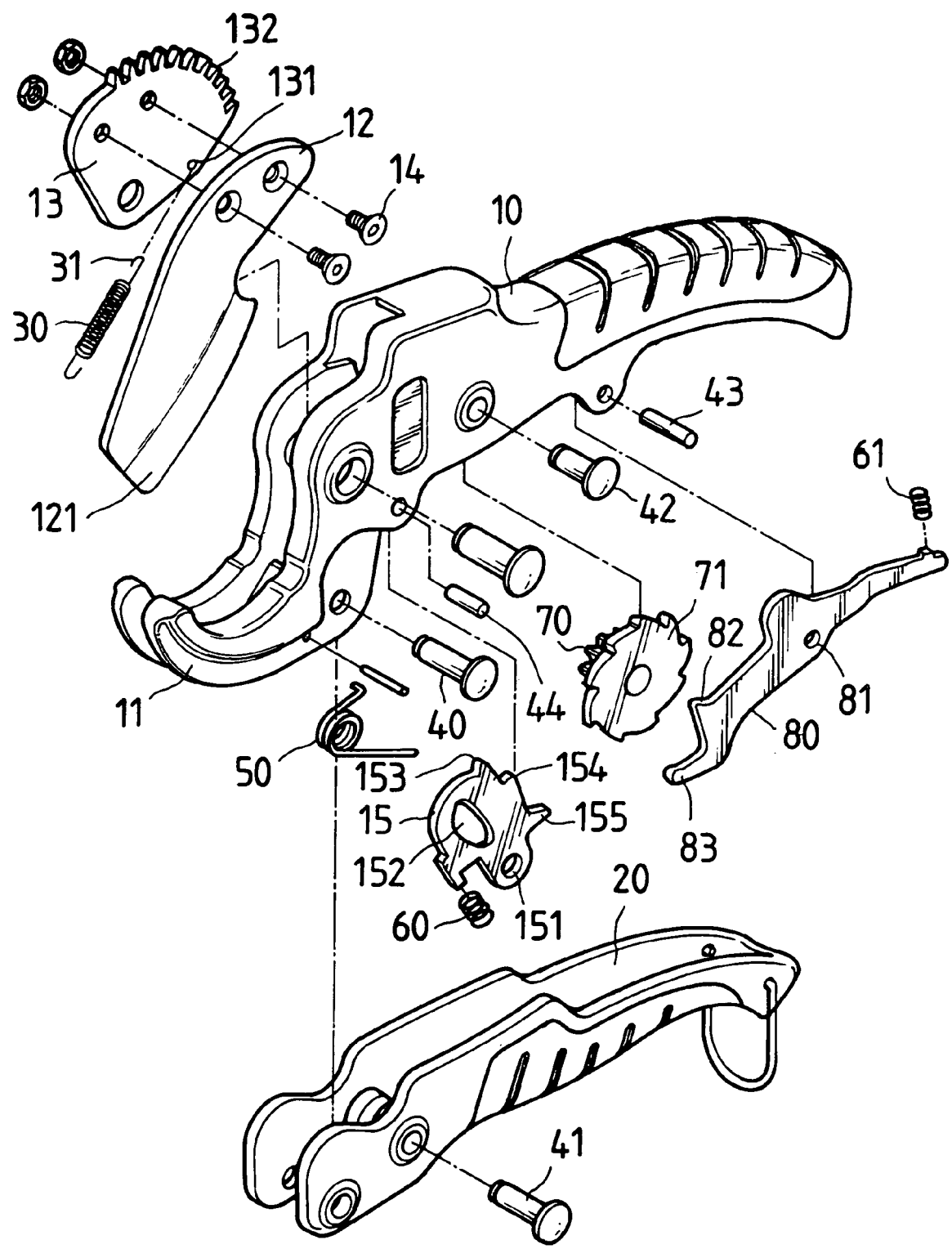
FIG. 3 is an exploded view of the scissors in FIG. 2.
Figure 4:
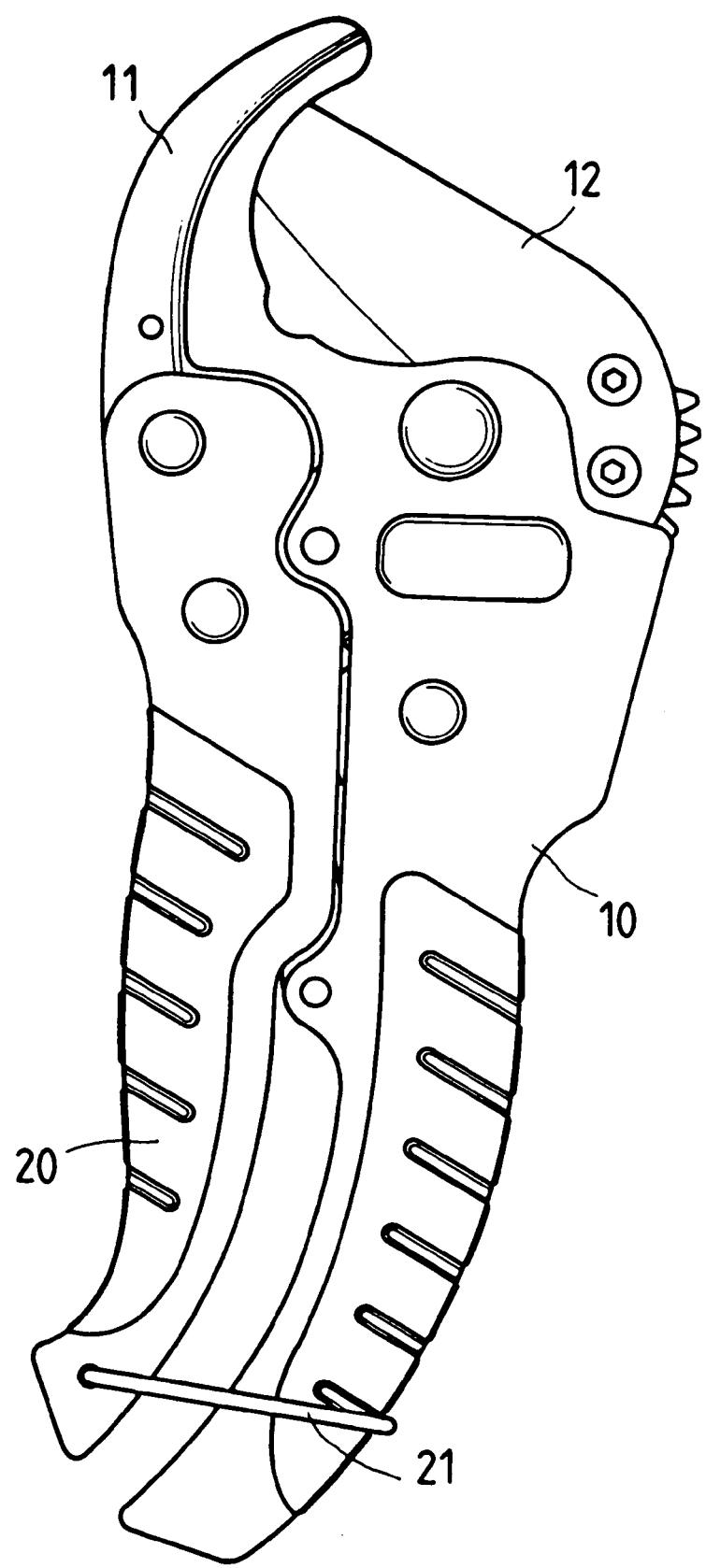
FIG. 4 is a side plan view of the scissors in FIG. 2.
Figure 5:
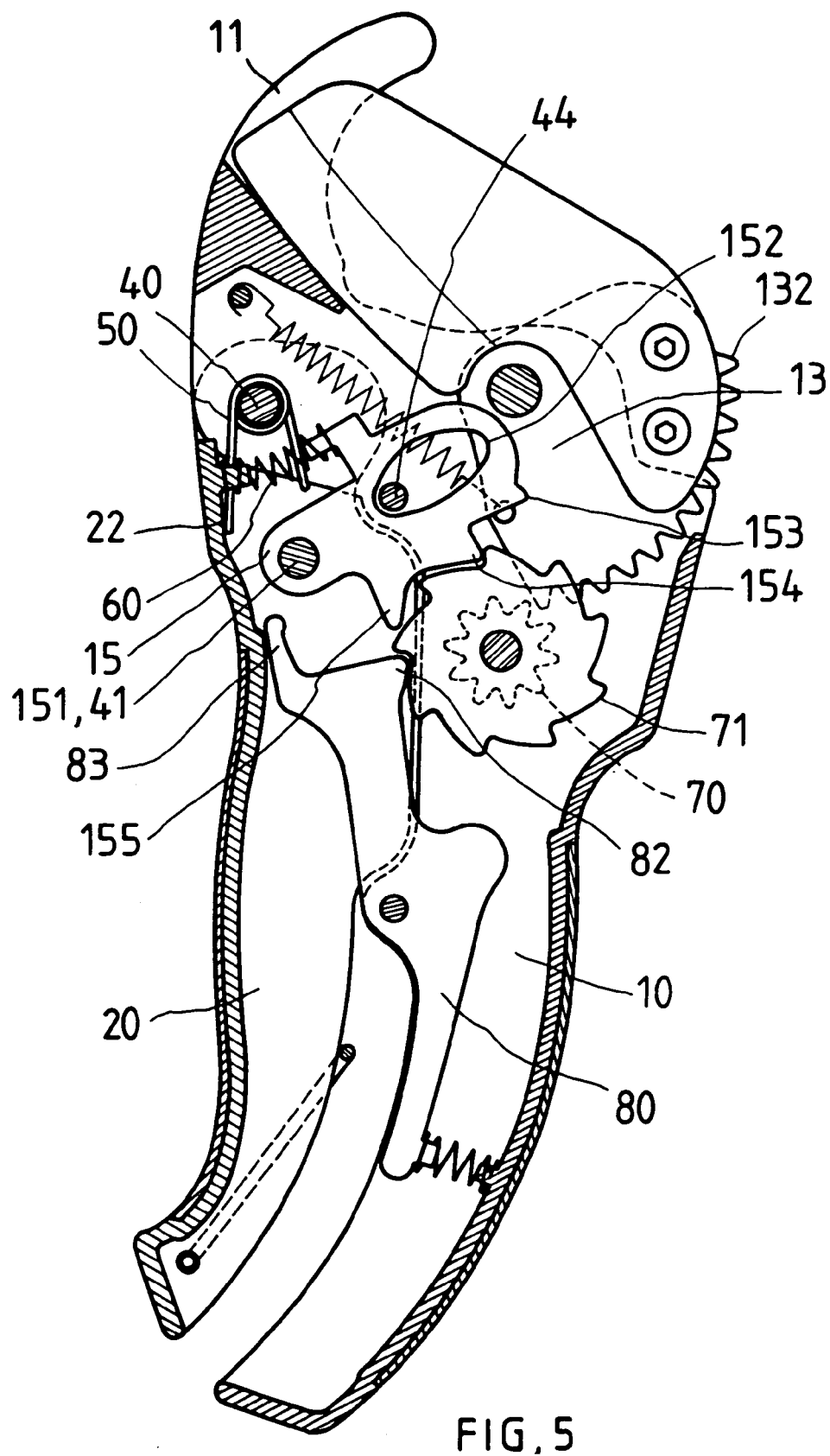
FIG. 5 is a sectional view of the scissors in FIG. 2.

Referring to FIGS. 2, 3, 4, and 5, a pair of ratchet scissors in accordance with a preferred embodiment of the invention comprises a movable second handle unit 20 of substantially U-section including a pivotal ring 22 provided at its rear open end, and an internal projection 22 provided at its front end; a stationary first handle unit 10 including a substantially U-shaped handle portion having a plurality of parallel slots thereon such that the ring 22 is adapted to dispose in one of the slots for fastening the first and second handle units 10 and 20 together in a storage state, an extended, bifurcated jaw 11 with either portion having an inner curved edge, a blade 12 disposed in the jaw 11 and pivotably connected to a joining portion of the handle unit 10 and the jaw 11 by means of a plurality of fasteners 14, the blade 12 having a cutting edge 121 a plate-shaped pivotal member 13 disposed in the jaw 11 and including a tab 131 on one surface, and a series of teeth 132 formed along an outer edge, the pivotal member 13 being pivotably connected to the blade 12 such that they can pivot together, and a pawl 15 including a first through hole 151, an oval second through hole 152, a first protrusion 153, a second protrusion 154 being engaged with one of the ratchet teeth 71 in a storage state of the scissors, and a third protrusion 155 being engaged with one of the ratchet teeth 71 in a storage state of the scissors; a helical first spring 60 having both ends anchored at a projecting portion of the pawl 15 and the projection 22; a first pin 41 inserted through a forward portion of the second handle unit 20 and the first through hole 151 for pivotably fastening the pawl 15 in the scissors; an annular member including a small gear 70 on a projected portion and a series of ratchet teeth 71 formed therearound; a second pin 42 inserted through an intermediate portion of the first handle unit 10 and a central through hole of the ratchet wheel 70 to pivotably dispose the ratchet wheel 70 in the first handle unit 10; a second spring 50 also having both ends anchored at the projecting portion of the pawl 15 and the projection 22; a third pin 40 inserted through the jaw 11 and a through hole of the second spring 50 to dispose the second spring 50 in the jaw 11; a third spring 30 including two hooks 31 at both ends in which one hook 31 is anchored at the tab 131 and the other hook 31 is anchored at an inner protuberance of the jaw 11; a pivotal lever 80 including an intermediate through hole 81, a first protuberance 83 in a forward end, the first protuberance 83 being urged against an inner surface of the second handle unit 20 in a storage state of the scissors (see FIG. 5), and a second protuberance 82 between the first protuberance 83 and the through hole 81, the second protuberance 82 as a pawl element being engaged with one of the ratchet teeth 71 also in a storage state of the scissors; a fourth pin 43 inserted through the handle portion of the first handle unit 10 and the through hole 81 to pivotably dispose the lever 80 in the scissors; a fourth spring 61 anchored between an inner surface of the first handle unit 10 and a rear projection of the lever 80; and a fifth pin 44 inserted through the joining portion of the handle portion of the first handle unit 10 and the jaw 11 and the second through hole 152. As shown in FIG. 4, a portion of the teeth 132 is exposed in a storage state of the scissors.

Figure 6:
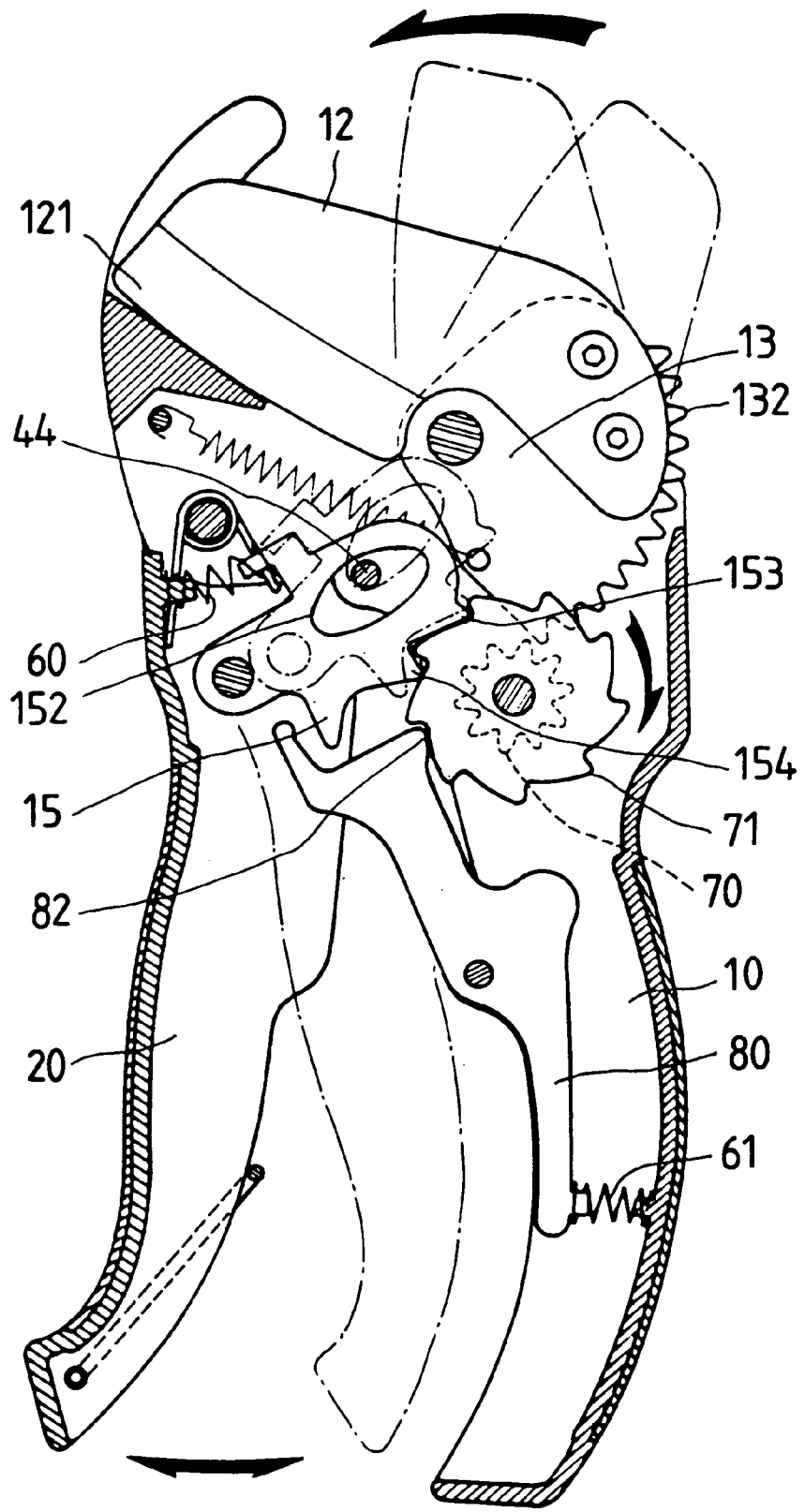
FIG. 6 is a view similar to FIG. 5 where the scissors is cutting a pipe.

Referring to FIG. 6, a cutting operation of the scissors will be described in detailed below. A user may first place a water pipe (not shown) in the open jaw in position. Next, the user may pivot the second handle unit 20 about the first handle unit 10 by exerting force. The pivoting continues by moving the second handle unit 20 alternately back and forth. As such, both the first protrusion 153 and the second protrusion 154 of the pawl 15 pivot counterclockwise in each action of pivoting the second handle unit 20 about the first handle unit 10. And in turn both the gear 70 and the ratchet teeth 71 rotate clockwise continuously. As a result, the teeth 32 pivot counterclockwise to cut the pipe. The cutting operation is smooth and stepwise and thereby causes no deformation to the cut pipe. Note that the second protuberance 82 as energized by the expanded fourth spring 61 always exerts a force on the engaged one of the ratchet teeth 71 in the reciprocation for preventing the ratchet teeth 71 from rotating counterclockwise.

Figure 7:
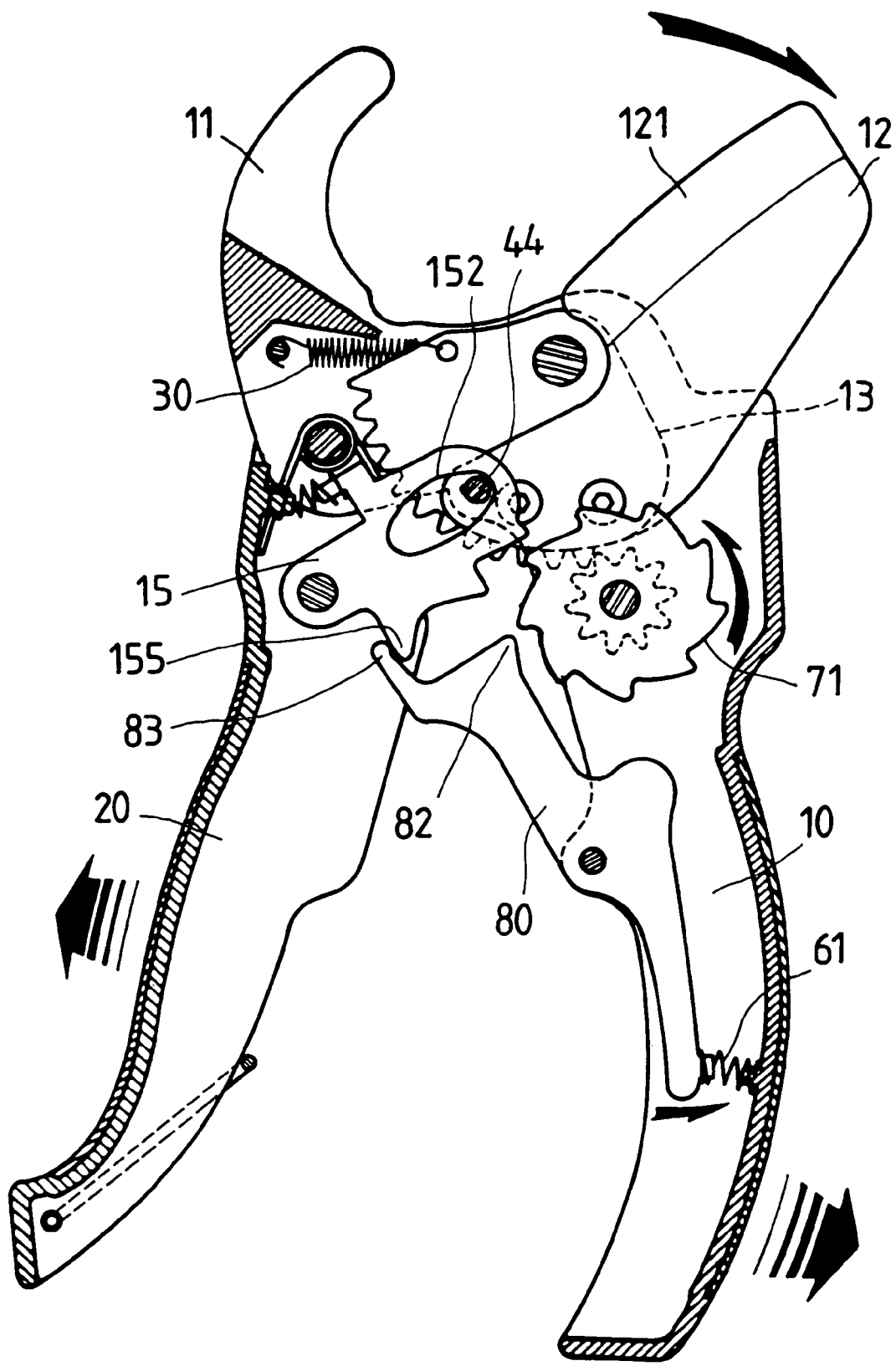
FIG. 7 is a view similar to FIG. 5 where the scissors is returning to a fully open position after cutting.

Referring to FIG. 7, after cutting a user may pull the second handle unit 20 away from the first handle unit 10 for disengaging the pawl 15 with the ratchet teeth 71. The pulling stops when one end of the second through hole 152 disengages with the fifth pin 44 (see FIG. 6) to dispose the fifth pin 44 in the other end of the second through hole 152. Also, the third protrusion 155 contacts the first protuberance 83 to pivot the lever 80 counterclockwise for disengaging the second protuberance 82 with the ratchet teeth 71 while the fourth spring 61 being compressed. Thus, the ratchet teeth 71, the pivotal member 13, and the blade 12 are free. The expanded third spring 30 (see FIG. 6) then compresses to pivot the pivotal member 13 and thus the blade 12 away from the jaw 11 (i.e., opening the jaw). Also, the ratchet teeth 71 rotate counterclockwise because the gear 70 rotates counterclockwise as driven by the clockwise pivoting of the teeth 132. The opening operation (i.e., returning to a fully open position) stops as the stored energy of the third spring 30 consumes.

While the invention herein disclosed has been described by means of specific embodiments, numerous modifications and variations could be made thereto by those skilled in the art without departing from the scope and spirit of the invention set forth in the claims.

What is claimed is:

1. Scissors for cutting a pipe comprising:
a movable first handle unit of substantially U-section including a rear pivotal ring;
a stationary second handle unit of substantially U-section including a plurality of parallel slots thereon with the ring disposed therein for fastening the first and the second handle units together in a storage state, a forward bifurcated jaw, a pivotal blade disposed in the jaw, a spring biased pivotal plate member disposed in the jaw and including a series of teeth formed along an outer edge, the plate member being pivotably connected to the blade, a rotation assembly including a gear and a ratchet wheel, and a spring biased pivotal pawl including an elongate channel, a first protrusion, a second protrusion engaged with the ratchet wheel, a third protrusion engaged with the ratchet wheel, and a pin disposed in one end of the channel; and
a spring biased pivotal lever including a forward protuberance urged against an inner surface of the first handle unit, and a pawl member engaged with the ratchet wheel;
whereby continuously pivoting the first handle unit about the second handle unit by moving the first handle unit alternately back and forth in each action of pivoting the first handle unit toward the second handle unit will pivot the first and the second protrusions counterclockwise, rotate the rotation assembly clockwise, and pivot the teeth counterclockwise to cut a pipe anchored in a position defined by the blade and the jaw; and
in response to cutting the pipe pulling the first handle unit away from the second handle unit will disengage the pawl with the ratchet wheel, move the pin to the other end of the channel, cause the third protrusion to contact the protuberance, pivot the lever counterclockwise to disengage the pawl member with the ratchet wheel for pivoting the plate member and the blade away from the jaw, and rotate the rotation assembly counterclockwise by causing the teeth to drive the gear.

* * * * *